United States Patent [19]

Taft

[11] Patent Number: 5,172,965
[45] Date of Patent: Dec. 22, 1992

[54] LOW GROUND PRESSURE TRACK WITH OFFSET LINK BORES

[75] Inventor: Morris E. Taft, Metamora, Ill.

[73] Assignee: Caterprillar Inc., Peoria, Ill.

[21] Appl. No.: 798,445

[22] Filed: Nov. 26, 1991

[51] Int. Cl.[5] .......................................... B62D 55/205
[52] U.S. Cl. ................................ 305/58 R; 305/39; 305/14
[58] Field of Search ................ 305/39, 58 R, 58 PC, 305/59, 11, 12, 14

[56] References Cited

U.S. PATENT DOCUMENTS

| | | | |
|---|---|---|---|
| 3,574,419 | 4/1971 | Hatch | 305/11 |
| 4,204,716 | 5/1980 | Baylor | 305/58 R X |
| 4,324,437 | 4/1982 | Narang | 305/58 R X |
| 4,438,981 | 3/1984 | Harms | 305/58 R X |
| 4,449,357 | 5/1984 | Balitch | 59/30 |
| 4,582,366 | 4/1986 | Burfield et al. | 305/11 |

FOREIGN PATENT DOCUMENTS 34498  8/1965  Fed. Rep. of Germany .... 305/58 R

Primary Examiner—Russell D. Stormer
Attorney, Agent, or Firm—O. Gordon Pence

[57] ABSTRACT

A low ground pressure track chain with track links with offset pin and bushing bores is disclosed. The track chain is provided with a plurality of low ground pressure track shoes and includes a like plurality of link sets coupled by a like plurality of joints. Each link set has one of the track shoes secured thereto and includes a pair of laterally spaced links. Each link has a laterally offset inboard end collar having a first bore, an opposite laterally offset outboard end collar having a second bore, and a rail surface. The rail surface has a predetermined overall width between an inner edge and an outer edge. An inner surface of the inboard end collar is offset inwardly from the inner rail edge and an outer surface thereof is substantially offset outwardly to a position where it is closer to the outer rail edge than to the inner rail edge to provide the first bore with a predetermined press length that is greater than one-half the width of the rail surface. An inner surface of the outboard end collar is likewise offset outwardly so as to lie outboard of the offset outer surface of the inboard end collar of an adjoining link. An outer surface thereof is substantially offset laterally at least 0.75 times the rail width beyond the outer edge of the rail surface to provide the second bore with a predetermined press length that is at least as great as the overall width of the rail surface.

5 Claims, 2 Drawing Sheets

LOW GROUND PRESSURE TRACK WITH OFFSET LINK BORES

TECHNICAL FIELD

The present invention relates to endless track chains for track-type vehicles and, ore particularly to track chains with links having offset bores for use with low ground pressure track shoes.

BACKGROUND ART

A low ground pressure track for track-type vehicles is a track that is equipped with extra long track shoes. The extra long shoes significantly increase the area of contact with the ground that supports the weight of the vehicle, thus reducing the pounds per square inch (or grams per square centimeter) that the track shoes exert on the ground. This lower ground pressure allows the track-type vehicle to operate on marshy or swampy terrain or in other loose underfoot conditions without becoming stuck or sinking too deeply into the ground. One problem that occurs with the use of these extra long shoes is the greater loads they exert on the track chain. Because of their length, the shoes have a greater moment arm that cause greater forces to be exerted on the chain. For example, a tip of the shoe may become caught by a tree stump or the like when turning the vehicle. The longer moment arm of the longer low ground pressure track shoe will exert a much greater twisting force on the track chain. Those skilled in the track art will appreciate that conventional track chain is constructed from link sets that are held together by press fits, e.g., the ends of the bushings and pins are pressed into bores in the links. Excessive twisting forces can loosen these press fits, resulting in end play that can unload the seals and cause the loss of lubricant from the track joints. The loss of lubricant results in internal pin and bushing wear and shorter track life.

The present invention is directed at overcoming the above problems.

DISCLOSURE OF THE INVENTION

In accordance with one aspect of the present invention, a low ground pressure track chain for track-type vehicles is provided with a plurality of low ground pressure track shoes and a like plurality of link sets coupled by a like plurality of joints. Each link set has one of the track shoes secured thereto and includes a pair of laterally spaced links. Each link has a laterally offset inboard end collar having a first bore, an opposite laterally offset outboard end collar having a second bore, and a rail surface. The rail surface has a predetermined overall width between an inner edge and an outer edge. Each of the joints includes a pin and a bushing. The pin has opposite end portions secured within a respective one of the second bores of the outboard end collars. The bushing is rotatably disposed about the pin and has opposite end portions secured within a respective one of the first bores of the inboard end collars. The inboard end collar has inner surface and an outer surface. The inner surface of the inboard end collar is offset inwardly from the inner rail edge and the outer surface thereof is substantially offset outwardly to a position where it is closer to the outer rail edge than to the inner rail edge to provide the first bore with a predetermined press length that is greater than one-half the width of the rail surface. The outboard end collar has an inner surface and an outer surface. The inner surface of the outboard end collar is likewise offset outwardly so as to lie outboard of the offset outer surface of the inboard end collar of an adjoining link. The outer surface thereof is substantially offset laterally at least 0.75 times the rail width beyond the outer edge of the rail surface to provide the second bore with a predetermined press length that is at least as great as the overall width of the rail surface.

BEST MODE FOR CARRYING OUT THE INVENTION

Figure 1:
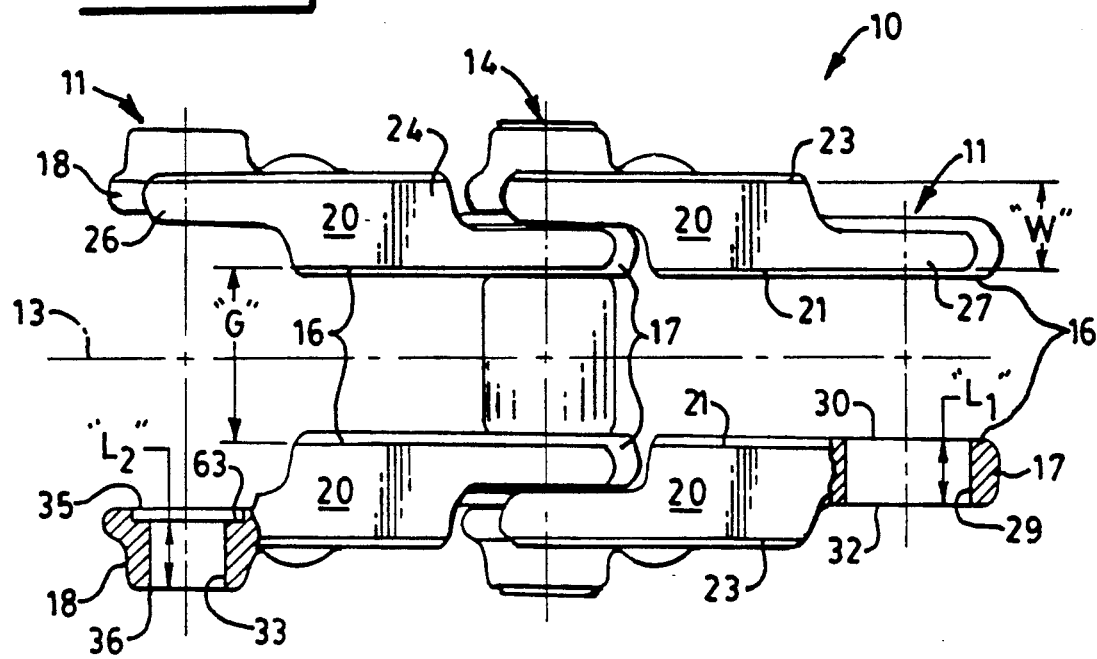
FIG. 1 is a plan view of a portion of an endless track chain embodying the principles of the present invention with portions broken away and shown in section.
Figure 2:
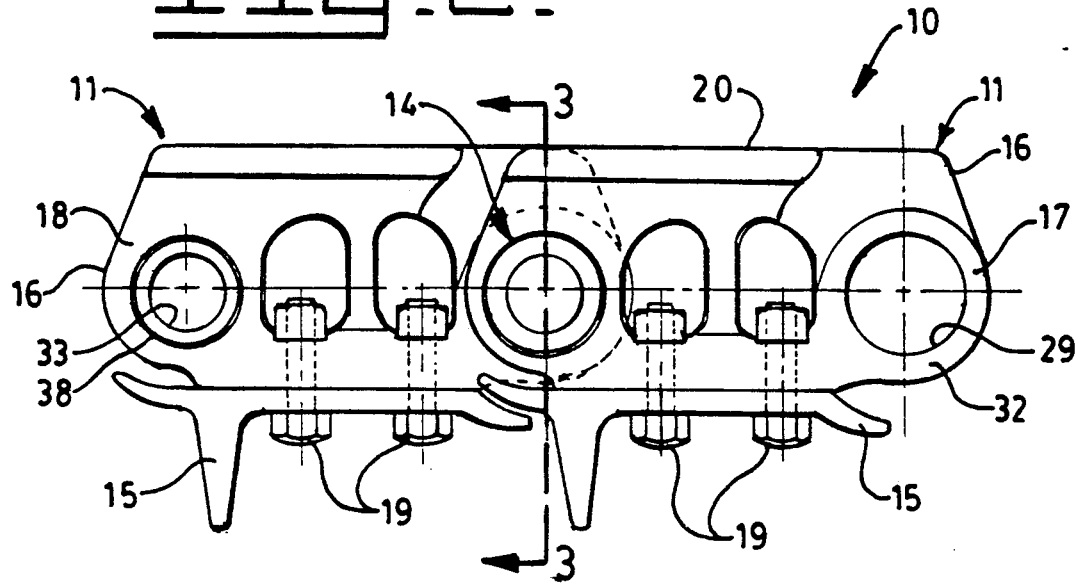
FIG. 2 is a side elevational view of the track chain shown in FIG. 1, but with track shoes added thereto.

Referring more particularly to the drawings, a low ground pressure track chain embodying the principles of the present invention is generally indicated at 10 in FIGS. 1 and 2 for use on a track-type vehicle (not shown). Track chain 10 is constructed from a plurality of link sets 11 which are articulately coupled in a transverse relation along a longitudinal centerline 13 of the chain 10 by a like plurality of hinge joints 14. A like plurality of extended length, low ground pressure track shoes 15 of any conventional configuration known in the art (FIG. 2) are secured to the link sets 11 by means of bolts 19. For a medium size tractor, low ground pressure shoes 15 may have a length of from about 30 inches (76 cm) to 36 inches (91 cm), vs. a standard show that is approximately 24 inches (61 cm) in length.

Figure 4:
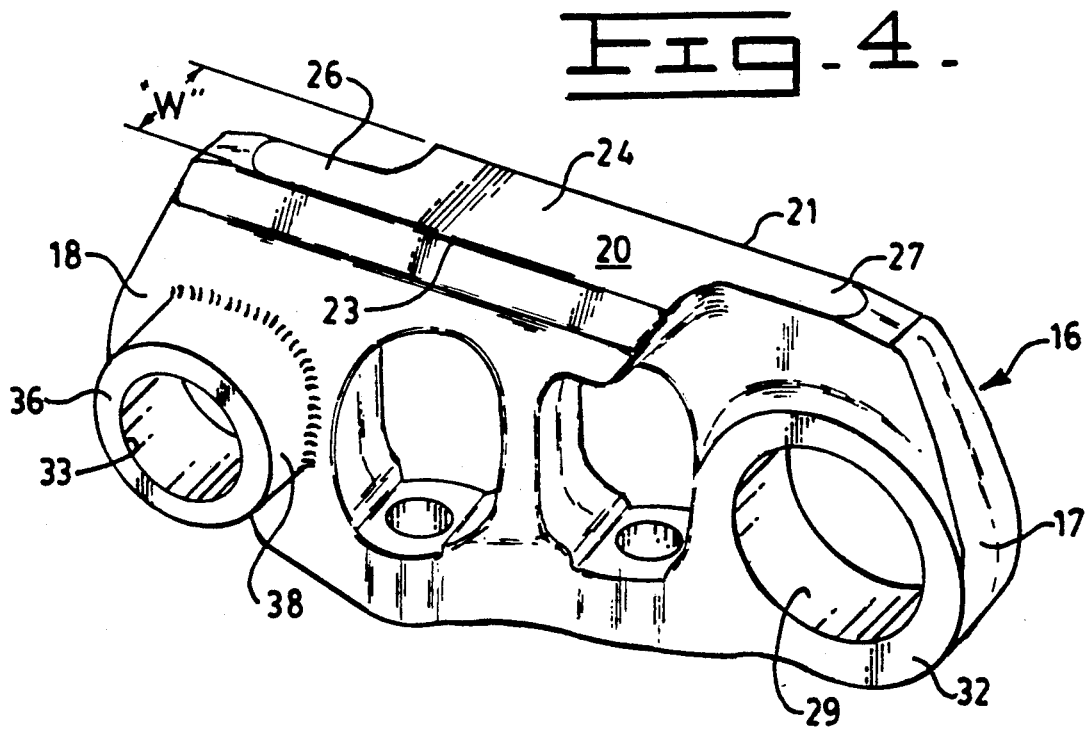
FIG. 4 is a full perspective view of one of the track links of the track chain shown in FIG. 1.

Each link set 11 includes a pair of laterally spaced, longitudinally extending links, one being a right-hand link and the other being a left-hand link. As such links are mirror images of each other, both are referred to herein by reference numeral 16. Each link 16 is provided with an inboard end collar 17 and an opposite outboard end collar 18. The inboard end collar 17 is disposed in a laterally inwardly offset relationship relative to the chain 10, while the outboard end collar 18 is disposed in a laterally outwardly offset relationship thereto. Link 16 further includes a longitudinally disposed rail surface 20. As best shown in FIGS. 1 and 4, such rail surface 20 has a predetermined overall width "W" between an inner edge 21 and an outer edge 23. Such rail surface 20 includes a full width central portion 24, a generally one-half width outboard portion 26 which extends along the outer edge 23 over the outboard end collar 18 and a generally one-half width inboard portion 27 which extends along the inner edge 21 over the inboard end portion 17. The distance between the inner edge 21 of one link 16 in the link set 11 to the inner edge 21 of the other link defines a rail gauge width "G".

The inboard end collar 17 has a first bore 29 therethrough which extends from an inner surface 30 (FIG. 1) of the inboard end collar to an outer surface 32 thereof. The inner surface 30 is offset inwardly from the inner edge 21 of the rail surface 20. The outer surface 32 is offset outwardly relative to the inboard portion 27 of the rail surface 20 so as to be disposed in a position substantially closer to the outer edge 23 of the rail surface 20 than to the inner edge 21 thereof. This offset positioning of the inner and outer surfaces 30,32, respectively, provide the first bore 29 with a predetermined press length "$L_1$" (FIG. 1) that is greater than one-half the width of the rail surface 20. Preferably, the outer surface 32 is positioned within a range of from substantially greater than 0.50 times to less than 1.0 times the rail width (W) from the inner rail edge 21.

The outer end collar 18 has a second bore 33 therethrough which extends from an inner surface 35 to an outer surface 36 of the end collar 18. The inner surface 35 is likewise offset outwardly from the inboard portion 27 of the rail surface 20 so as to lie outboard of the offset outer surface 32 of the inboard end collar 17 of an adjoining link in the track chain 10. It should be appreciated that the offsetting relationship of the end collars 17,18 permits the outboard end collars 18 of one link set to overlap the inboard end collars 17 of an adjoining link set in the track chain. As shown in the drawings, the outboard surface 36 of the outboard end collar 18 is provided on a pin boss 38. The outer surface 36 is thus offset laterally a substantial distance from the outer edge 23 of the rail surface 20 to provide the second bore 33 with a predetermined press length "$L_2$" that is at least as great as the overall width "W" of the rail surface 20. Preferably, the outer surface 36 is offset laterally at least 0.75 times the rail width " W" beyond the outer edge 23 of the rail surface 20.

Figure 3:
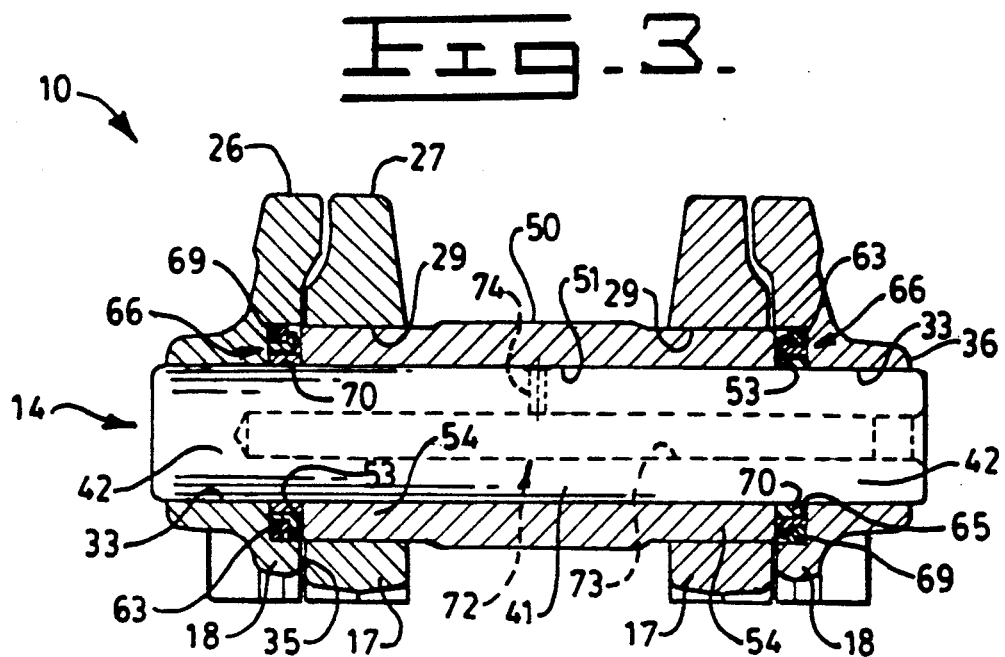
FIG. 3 is a transverse cross-sectional view taken along lines 3—3 of FIG. 2 through a hinge joint thereof, but with the track shoe removed.

Referring more particularly to FIG. 3, the joint 14 includes a cylindrical pin 41 and a tubular bushing 50. The pin 41 has opposite end portions 42, each of which is pressed and non-rotatably mounted into a respective one of the second bores 33 of the outboard end collars 18 of each link 16 in a link set 11.

The tubular bushing 50 is provided with a pin bore 51 which is of a size sufficient to freely rotatably mount the pin 41 therewithin. Bushing 50 has a pair of opposite end faces 53 on opposite end portions 54 thereof. The opposite end portions 54 are of a size to be press fitted and nonrotatably mounted into respective ones of the first bores 29 of the inboard end collars 17. As can seen, the first bores 29 are substantially larger than the second bores 33 in order to receive the bushing end portions 54. The bushing 50 is of a hardened steel alloy. Preferably the pin bore 51 and the end faces 53 have a hardness of at least Rockwell C. 55 and, preferably, a hardness of Rockwell C. 57-62.

Means 72 for lubricating the joint 14, as well as means 66 for sealing lubricant in and abrasives out of joint 14, are also provided. Lubricating means 72 includes a plugged bore in the pin 41 defining a lubricant reservoir 73 and a radial passage 74. Passage 74 communicates lubricant in the reservoir 73 with the pin bore 51 of the bushing 50. Seal means 66 includes a pair of seals 69 to provide sealing between the inboard end collars 17 and the outboard end collars 18. To accommodate the pair of seals 69, the second bores 33 of the outboard end collars are provided with a counterbore 63. Counterbore 63 has a shoulder 65 at the bottom thereof which is disposed outwardly from the inner surface 35 of the outboard end collar 18. One of the pair of seals 69 is disposed within each of the counterbores 63 between the shoulder 65 of the counterbore and the adjacent end face 53 of the bushing 50 and in sealing engagement against the end face 53. A pair of thrust rings 70 are disposed internally of each of the seals 69. The thrust rings 70 are provided to maintain a predetermined minimum axial spacing for the seals 69 to prevent the seals from being crushed during assembly or operation.

Industrial Applicability

The endless track chain 10 constructed in accordance with the teachings of the present invention advantageously provides significantly improved structural integrity and load carrying capacity for a track chain 10 equipped with low ground pressure track shoes 15 without any disadvantageous increase of the rail gauge dimension "G".

The present invention advantageously provides greater bushing pin and retention capacity by providing longer press lengths "$L_1$" for the bushing end portions 54 without any increase in the rail gauge width "G" or loss in the structural integrity of the track chain 10. This advantage is achieved by the use of a unique link design in the present invention. Such link design provides the first bore 29 in the inboard end collars 17 of the links 16 with a longer press length "$L_1$" that is sufficient to accommodate the longer bushing end portions 54 so that the press fitted connection between the bushing end portions 54 and the inboard end collars 17 is sufficient to provide a greater amount of structural integrity of the joint 14 needed by the longer low ground pressure shoes 15 during track operation. Likewise, the press length "$L_2$" of the second bores 33 in the outboard end collars 18 of the links 16 is provided with a greater press length "$L_2$" needed to maintain the press fitted connection of the outboard end collars 18 with the end portions 42 of the pin 41. These bore lengths "$L_1$", "$L_2$" are provided in the design of the link 16 by offsetting the bore lengths relative to their respective half-width portions 26,27 of the rail surface 20 on the links 16. The overall width of the joint is increased without disturbing the location of the rail surface 20, thus allowing the rail gauge "G" to be maintained at a desired dimension, or not increased, so as not to affect the other components of the track-type vehicle or prevent the use of the present track chain 10 as a replacement for existing types of track chains.

Lubricating means 72 are provided to lubricate the joint 14 and negate internal frictional wear between the pin 41 and the bushing 50 where relative pivotal movement occurs. Sealing means 66 are provided in the joint 14 to seal in lubricant and to seal out abrasives. The sealing means 66 includes a pair of seals 69. The pair of seals 69 are conventionally located in counterbores 63 in the outboard end collars 18 of the links 16 to seal between the overlapping inboard and outboard end collars 17,18 of adjoining link sets 11.

Other aspects, objects and advantages of the present invention can be obtained from a study of the drawings, the disclosure, and the appended claims.

I claim:

1. In a low ground pressure track chain for track-type vehicles, said track chain including a plurality of low ground pressure track shoes and a like plurality of link sets articulately coupled by a like plurality of joints, each link set having one of said track shoes secured thereto and including a pair of laterally spaced links, each link having a laterally offset inboard end collar having a first bore, an opposite laterally offset outboard end collar having a second bore, and a rail surface, said rail surface having a predetermined overall width between an inner edge and an outer edge, and each of said joints including a pin and a bushing, each of said pins having opposite end portions secured within a respective one of said second bores of said outboard end collars, and each of said bushings being rotatably disposed about said pin and having opposite end portions secured within a respective one of said first bores secured within a respective one of said first bores of said inboard end collars, the improvement comprising:

said inboard end collar of each link having an inner surface and an outer surface, said inner surface of said inboard end collar being offset inwardly from said inner rail edge/and said outer surface thereof being substantially offset outwardly to a position where it is closer to said outer rail edge than to said inner rail edge to provide said first bore with a predetermined press length that is greater than one-half the width of said rail surface; and said outboard end collars of each link having an inner surface and an outer surface, said inner surface of said outboard end collar being likewise offset outwardly so as to lie outboard of the offset outer surface of the inboard end collar of an adjoining link and said outer surface thereof being substantially offset laterally at least 0.75 times the rail width beyond the outer edge of said rail surface to provide said second bore with a predetermined press length that is at least as great as the overall width of said rail surface.

2. The track chain of claim 1 further comprising:
means for lubricating said joint; and
means for sealing lubricant in and foreign matter out of said joint.

3. The track chain of claim 2 wherein said bushing has a pair of opposite end faces and said outboard end collars of each link has a counterbore about said second bore thereof extending outwardly from said inner surface of said outboard end collar and having a shoulder at the bottom thereof, and wherein said sealing means includes:

a pair of seals, each seal being disposed between a respective one of said shoulders of said counterbores and the adjacent outer end face of said bushing end portions and in sealing engagement against said outer end face; and a pair of thrust rings, one of said thrust rings being disposed internally of a respective one of said seals.

4. The track chain of claim 3 wherein said pin bore of said bushing and said end faces of said bushing end portions have a hardness of at least Rockwell C. 55.

5. The track chain of claim 4 wherein said lubricating means includes a lubricant reservoir and a radial passage, said radial passage communicating lubricant from said reservoir to said pin bore of said bushing.

* * * * *

UNITED STATES PATENT AND TRADEMARK OFFICE
CERTIFICATE OF CORRECTION

PATENT NO. : 5,172,965

DATED : December 22, 1992

INVENTOR(S) : MORRIS E. TAFT

It is certified that error appears in the above-identified patent and that said Letters Patent is hereby corrected as shown below:

On the title page: item [73], after Assignee:, change "Caterprillar" to --Caterpillar--.

In claim 1, column 5, line 11, change "edge/and" to --edge and--.

Signed and Sealed this

Twenty-sixth Day of October, 1993

Attest:

BRUCE LEHMAN

Attesting Officer     Commissioner of Patents and Trademarks